United States Patent [19]

Visser

[11] Patent Number: 5,068,999
[45] Date of Patent: Dec. 3, 1991

[54] APPARATUS AND METHOD FOR PLANTING OUT PLANTS

[75] Inventor: Anthony Visser, 's-Gravendeel, Netherlands

[73] Assignee: Visser 's-Gravendeel Holding B.V., 's-Gravendeel, Netherlands

[21] Appl. No.: 382,067

[22] Filed: Jul. 14, 1989

Related U.S. Application Data

[63] Continuation of Ser. No. 68,351, Jul. 1, 1987, abandoned.

[30] Foreign Application Priority Data

Jul. 7, 1986 [NL] Netherlands ............... 8601765

[51] Int. Cl.⁵ .................................. A01G 23/02
[52] U.S. Cl. ............................ 47/73; 47/901; 47/1.7; 47/86
[58] Field of Search ............ 47/1.01, 1.7, 73, 83, 47/84, 85, 86, 901

[56] References Cited

U.S. PATENT DOCUMENTS

| | | | |
|---|---|---|---|
| 3,389,499 | 6/1968 | Haile | 47/83 |
| 3,415,013 | 12/1968 | Galbraith | 47/73 |
| 3,726,042 | 4/1973 | Haile | 47/83 |
| 4,133,274 | 1/1979 | Orth et al. | 47/73 |
| 4,246,725 | 1/1981 | Branfman | 47/73 |

FOREIGN PATENT DOCUMENTS

| | | | |
|---|---|---|---|
| 7900943 | 8/1980 | Netherlands | 47/73 |
| 8200027 | 8/1983 | Netherlands | 47/1 A |

Primary Examiner—David A. Scherbel
Assistant Examiner—Linda J. Watson
Attorney, Agent, or Firm—Watson, Cole, Grindle & Watson

[57] ABSTRACT

This invention relates to an apparatus and a method for the planting out of the plants wherein the plants to be planted out are fitted into pieces of substrate. Said pieces of substrate are located in compartments formed between blocks fitted onto strips. Usually these strips are located adjacent and each second strip is shifted lengthwise over the length of a block, being equal to the length of a compartment so that a chess-board-pattern develops in plan view. For the planting out, the strips are separated and subsequently supplied to a pushing element which pushes the pieces of substrate including the plants in a transverse direction out of the strip and into bigger containers. To use only a single directional movement the strips are inclined relative to the bigger containers. To compensate for this inclination the pieces of substrate are slightly rotated during the movement.

19 Claims, 3 Drawing Sheets

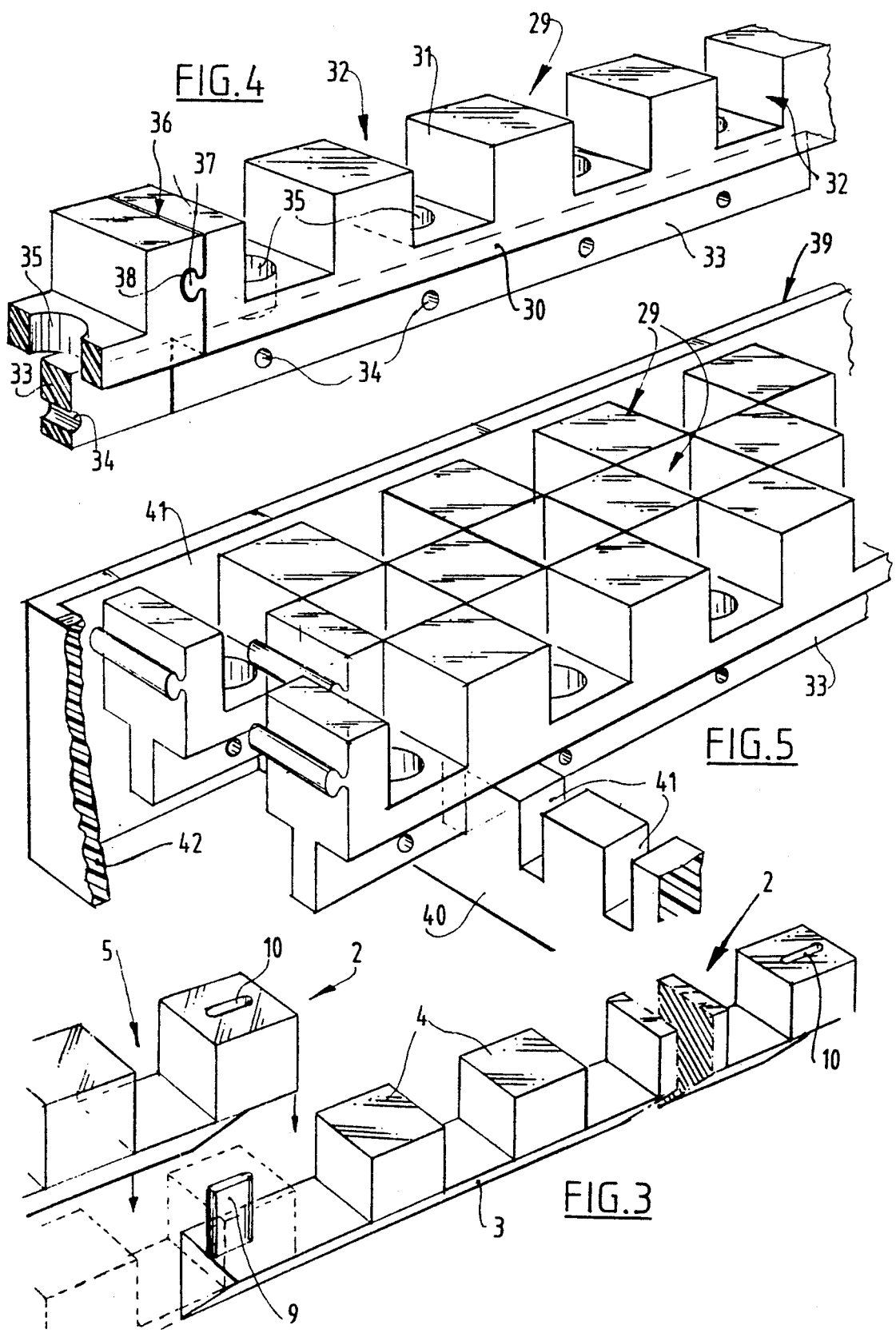

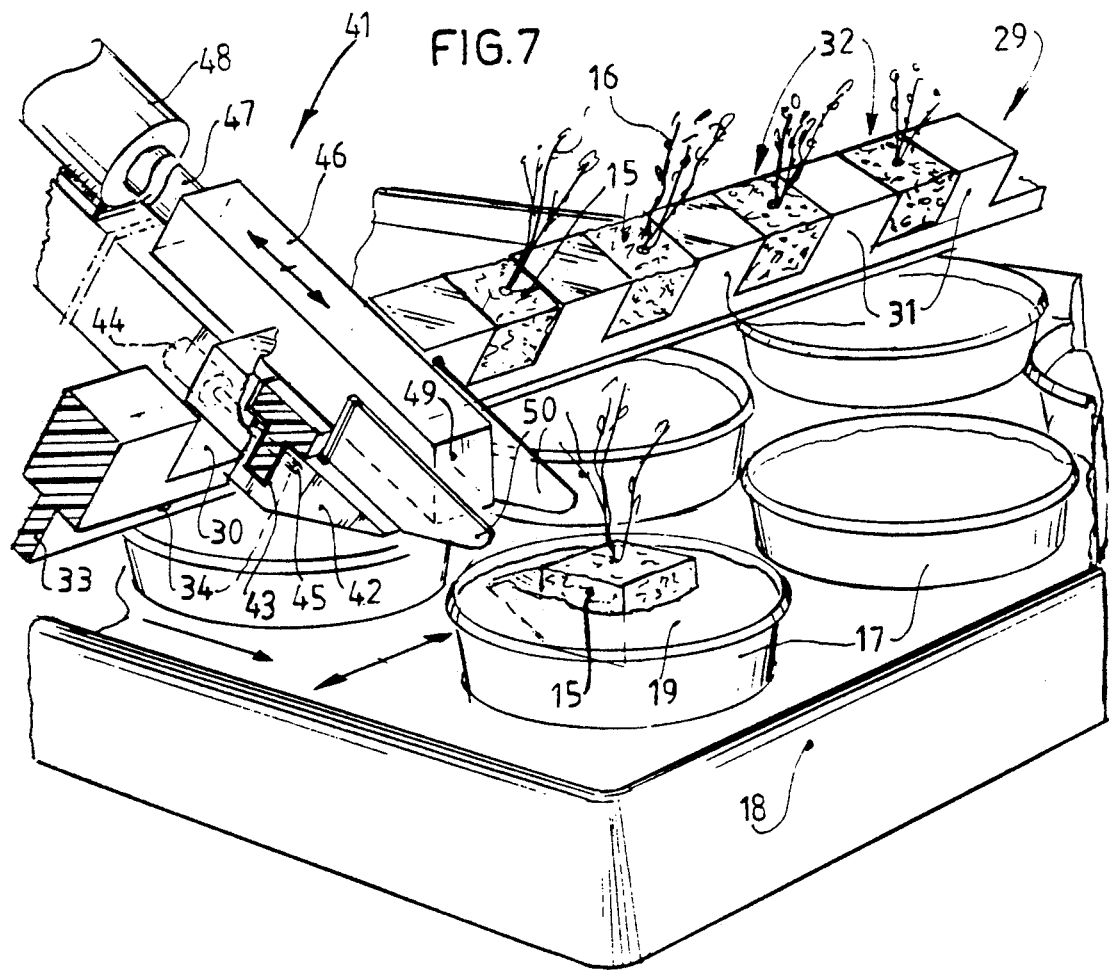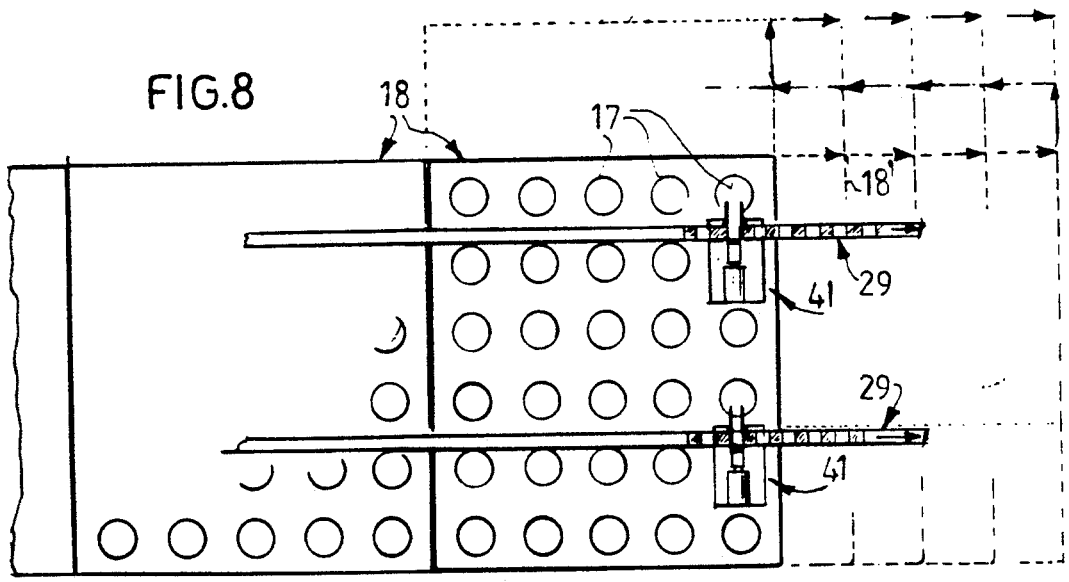

APPARATUS AND METHOD FOR PLANTING OUT PLANTS

This application is a continuation of application Ser. No. 068,351, filed 07/01/87 now aband.

BACKGROUND OF THE INVENTION

The present invention relates to a method for planting out of plants, wherein pieces of substrate located into other pieces of substrate and each comprising a germinated plant are relocated relative to each other.

Such a method is generally known.

If this known method is executed manually, it is a labour-intensive and thus costly process. In the past trials have been executed to mechanize the planting out of plants.

Apparatuses for planting out of plants known hitherto had the disadvantage that the plants to be planted out where grasped with their pieces of substrate and were then moved from a small container to a large container. When they were grasped, the plants were often damaged as the pieces of substrate where grasped from above.

Another disadvantage of this known apparatus for planting out is that, through the combination of the grasping of the pieces of substrate, the lifting of the pieces of substrate and the execution of a horizontal movement and a downward movement into a larger container, a complicated execution develops which cannot be executed fast. Further, it is remarked that for an economical use it is of utmost importance that the apparatus for planting out works fast, as great numbers of plants have to be planted out.

One aim of the present invention is the providing of a method and an apparatus for planting out wherein the plants to be planted out are not damaged.

Another aim of the present invention is the providing of a method and an apparatus for the planting out of plants, which allows fast processing.

Both aims are reached by a method and an apparatus for the planting out of plants, in which strips on which compartments are located with open walls perpendicular to the longitudinal direction of the strip are used for containers of the pieces of substrate, and wherein the pieces of substrate are pushed out of the compartments by a pushing movement which extends perpendicular to the longitudinal direction of the strips.

Subsequently the present invention will be elucidated with the help of the accompanying drawings.

BRIEF DESCRIPTION OF THE DRAWINGS

FIG. 3 is a perspective view of two strips according to the first embodiment;

FIG. 4 is a perspective view partially broken away, of a strip according to a preferred embodiment of the invention;

FIG. 5 is a perspective view of an assembly of strips according to FIG. 4;

FIG. 7 is a perspective view of a preferred embodiment of the apparatus according to the present invention; and FIG. 8 shows a schematic paln view of two apparatuses according to the present invention working simultaneously.

DETAILED DESCRIPTION OF THE PREFERRED EMBODIMENTS

Figure 1:
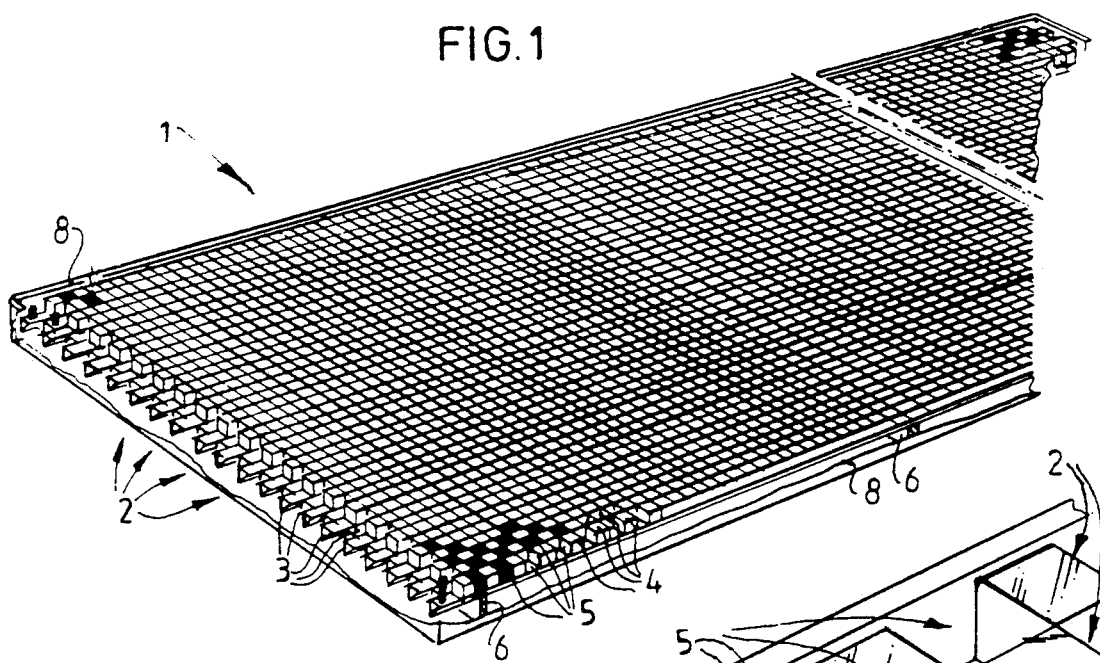
FIG. 1 is a perspective view, partially broken away, of an assembly of strips which is formed by strips according to a first embodiment of the invention located adjacent to each other.

The strip assembly 1 depicted in FIG. 1 comprises a number of strips 2, each comprising a supporting body 3 having a triangular cross-section. On the supporting body 3 cubes 4 are provided such as to keep compartments 5 open between the cubes 4 and wherein the size of the compartments 5 is equal to that of the cubes 4. The strips 2 including the cubes 4 are preferably in one piece and manufactured of plastic.

Figure 2:
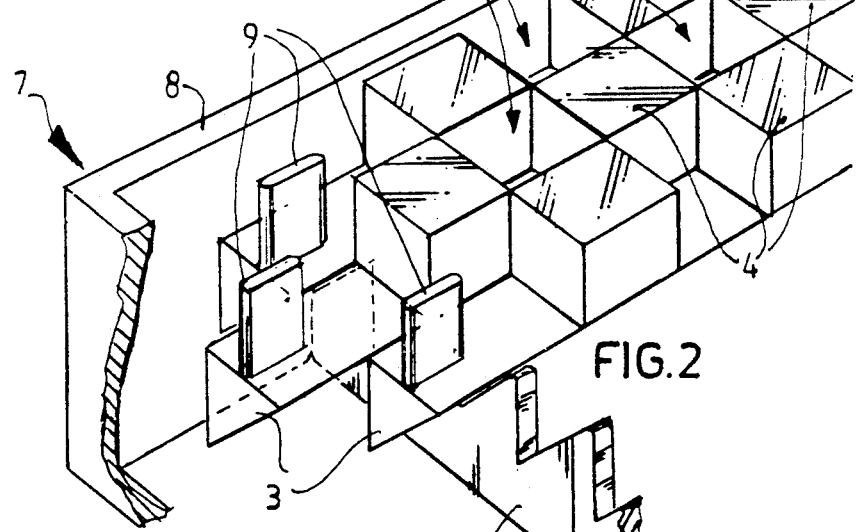
FIG. 2 is a perspective detailed view of an assembly of strips according to FIG. 1.

The perspective detailed view depicted in FIG. 2 shows how the strips 2 with their triangular supporting body 6 are located on a supporting-wall 6. This supporting-wall 6 comprises sawtooth-shaped incisions, in which the supporting body 3 fits, so that the upper surface of the supporting body 3 is vertical. The supporting-walls 6 form a part of a tray-like container 7, which comprises side walls 8 so that a strip assembly 1 is provided which can be handled easily.

To connect the strips 2 to each other after they have been taken out of the container 7, each of the strips comprises a connecting cam 9 on one end whereas the end which is not depicted is provided with a connecting groove 10. To limit all four sides of the compartments between the cubes 4, adjacent strips are shifted mutually over the length of a cube so that the compartments are limited by the cubes of adjacent strips. Consequently the strip assembly 1 shows a chess-board-pattern in plan view.

The sawtooth-shaped incisions in the supporting walls are located such as to make the strips 2 contiguous.

For the germinating of the plants, growing material is spread over the strip assembly 1 so that this material enters all compartments 5, after which the remaining growing material is removed. With the help of a suitable machine, which is not a subject of the present invention, a seed is applied in every compartment, after which the strip assembly is put into a germinating cabinet. When the strip assembly has spent the required length of time in the germinating cabinet and when a sufficient number of seeds have germinated and the plants thus developed have come up sufficiently, the strip assembly 1 is removed from the germinating cabinet. According to this method, the actual planting out of the plants, or the reduction of the density of the plants per area, is stepwise; in the first step the density is reduced in a first direction while in the second step the density is reduced in a second direction, perpendicular to the first direction.

In the method and the apparatus according to the present invention the first step takes place by the separation of the strips 2. The strips 2 are taken out of the container and are subsequently placed in a groove which is not depicted and wherein the strips are mutually connected by means of the connecting cams 9 and the connecting grooves 10.

The preferred embodiment of the strips according to the present invention depicted in FIG. 4 each comprise a bottom 30, onto which cubes 31 are located such as to form compartments 32 between the cubes 31 wherein the size of the compartments is equal to that of the cubes 31. A rail 33 is provided under the bottom 30. In this rail holes 34 are fitted in which engaging means can be inserted to make the strip move along. Further in the bottom 30 drainage openings 35 are provided on the location of each compartment 32. The sizes of said drainage openings 35 are such that these openings 35 are wider than the rail 33, so that each opening 35 discharges into the lower side of the bottom 30.

On one of each ends 36 each strip comprises a meander-shaped extension 37 and comprises on its other end 36 a similarly shaped meander-shaped cutaway 38. By means of the cutaway 38 and the extension 37 the strips can be connected to each other. This takes place by shifting the strips sideways into each other whereby possible contaminations are pushed out automatically. To enhance this self-cleaning action all edges of respectively the cutaway 38 and the extension 37 are rounded off thus developping the meander-shape.

FIG. 5 shows how a number of the strips 29 is adjacently located in a container 39. The container 39 comprises at least two cross-beams 40, in which incisions 41 are made wherein the respective rails 33 fit. The incisions 41 have such a mutual distance such that the strips 29 are closely contiguous when the are located into the container 39. By shifting every second strip 29 over the length of respectively one cube or one compartment, a chess-boardpatern develops so that every compartment is surrounded by four walls.

To limit the outer strips 29 the container 39 has been provided on its sides of sidewalls 41. Front and rear walls 42 are fitted as well. During the planting out the strips 29 are taken out of the container 39 one by one and located onto a supply groove and are coupled with the preceding strip so that the strips are supplied to the apparatus for planting out according to the present invention.

Figure 6:
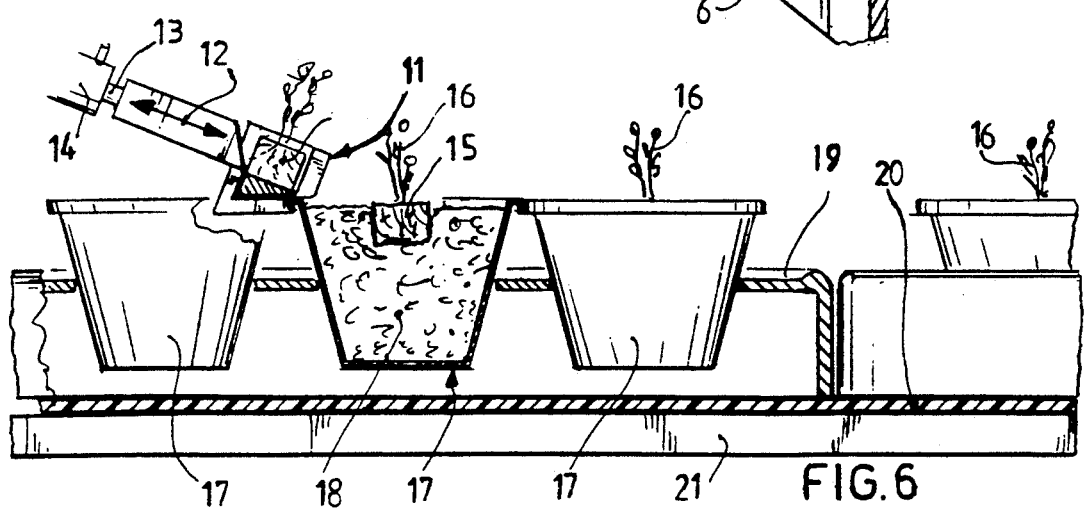
FIG. 6 is a cross-sectional view of an apparatus according to the present invention.

In FIG. 6 the planting out in the second direction is illustrated; the strips 2 connected to each other are supplied in a groove 11. In its sidewalls the groove 11 has opposite openings, through where a pushing element 12 is movable. This pushing element 12 is connected with a piston rod 13 of a linear pneumatic driving device 14. When the compartment 5 with the piece of substrate 15, in which a plant 16 is located is placed between the two openings provided in the sidewalls of groove 11, the pushing element 12 pushes the piece of substrate 15 from the compartment 5 through one of the openings into a bigger container 17. Because the pushing movement extends only in one direction, the container 17 is located in the extension of the path of the pushing element 12. The piece of substrate 15 has to be driven into the growing material inside the container 17 as far as possible. Nevertheless the position of the plant 16 has to be maintained as much as possible in the direction extending perpendicular to the upper side of the growing material. To reach this aim the container 17 is inclined with regard to the direction of movement of the pushing element. This inclination is limited as much as possible to keep the plant 16 in its original position. The container 17 is located so that the piece of substrate 15 moves just over the edge of the container 17 into the growing material 18. The growing material 18 is so soft that the harder piece of substrate 15 will move into it.

When this process has been completed the pushing element 12 moves back to its original position and the strip 2 is moved over the sum of the lengths of a compartment and a cube, the container 17 being moved over the length of one container after which the process is being repeated. The groove 11 is provided with drive members which engage with the empty compartments 5 to move the strips connected to each other; and The containers 17 are placed in container trays 19, which are located on a conveyor belt 20. By having the conveyor belt 20 moving over the length of a container the next pot 17 is located in front of the pushing element 12. To bear the weight of the pots and of the container trays a supporting plate 21 is located under the conveyor belt 20.

FIG. 7 shows a prefered embodiment of the apparatus for the planting out of plants. This apparatus makes use of the prefered embodiment of the strips 29. It would also be possible to make use of the strips depicted in FIG. 3, for which the apparatus would have to be adapted. This prefered embodiment comprises a guide over which the strip is supplied. This guide is in the drawing depicted only adjacent the pushing element and has been designated by number 42. The guide 42 comprises a groove 43 in which the rail 33 of the strip 29 fits. Adjacent the pushing element a conveying mechanism 44 is provided for moving the strip 29 concerned over one pitch, or the sum of the lengths of a cube and a compartment. This conveying mechanism comprises a moveable pin 45 which can engage into the holes 34 in the strip 33 and thus can convey the rail 29 further. A pushing element 45 has been provided, which is a rod 46 drivable by a driving device 47, for instance a solenoid or a hydraulic or pneumatic cylinder. The pushing element 46 comprises an inclined surface 49 which pushes the substrate 15 with the plant 16 therein from the compartment 32 into the growing material 19 in the container 17. To have the piece of substrate 15 properly inclined during this movement, which is necessary because the strip 29 is inclined with regard to the containers 17, a pair of resilient members 50 are provided on opposite sides of the path traversed by the piece of substrate. Members 50 frictionally engage the piece of substrate so that the sides of the piece are disposed parallel with the surface 49 of the pushing element 46 whereby the substrate is properly positioned in the container 17.

FIG. 8 shows a schematic plan view of two devices according to the present invention working simultaneously. When two devices operate simultaneously, the danger develops that the plants, planted out by the first apparatus are "decapitated" by the second apparatus. To avoid this, the container trays, wherein the containers are located into which the plants are planted out are moved such that initially the container tray is moved in one direction parallel to the longitudinal direction of the strips and subsequently one row of containers is shifted and is moved back in the direction parallel to the longitudinal direction, and subsequently shifts one row of containers again. Of course this can be extended to the required number of rows of pots.

I claim:

1. Apparatus for germinating and growing seedlings for subsequent transplant which comprises the combination of a plurality of separate strips and support tray means for removably holding the strips in side-by-side packed relation, each strip having a uniform width and being provided with a bottom and a plurality of upstanding blocks each of said uniform width and with the blocks being disposed in uniformly spaced relation along the length of each strip in which the uniformly spaced relation is equal to said uniform width so as to present upwardly opening recesses in said uniformly spaced relation along the length of each strip and which recesses are open at the opposite sides of each strip, the recesses of adjacent strips being staggered in said uniformly spaced relation so that the recesses of the side-by-side packed strips define a checkerboard pattern in said support tray means, and said support tray means positioning upper surfaces of the blocks in substantially the same plane to facilitate filling the recesses with soil for implantation of seed for germination and growth.

2. Apparatus as defined in claim 1 wherein opposite ends of each strip are provided with coupling means for removably coupling strips in end-to-end relation after removal of strips from the support tray means.

3. Apparatus as defined in claim 2 wherein the coupling means comprises a slot at one end of each strip and an upstanding blade at the other end of each strip.

4. Apparatus as defined in claim 2 wherein the coupling means comprises a tongue-in-groove connection, a tongue being provided on one end of each strip and a groove being provided on the other end of each strip.

5. Apparatus for germinating and growing seedlings for subsequent transplant which comprises an elongate strip having a uniform width and being provided with a bottom and a plurality of upstanding blocks each of said uniform width and with the blocks being disposed in uniformly spaced relation along the length of each strip in which the uniformly spaced relation is equal to said uniform width so as to present upwardly opening recesses in said uniformly spaced relation along the length of each strip and which recesses are open at the opposite sides of each strip, the strip having an underside provided with a depending guide whereby the strip may be located with the recesses vertically disposed to receive a plug of soil, exposed at opposite sides thereof, in which to germinate and grow a seedling in vertical direction.

6. Apparatus as defined in claim 5 wherein the bottom of each recess is provided with a drainage opening.

7. An elongate strip for germinating and growing seedling for subsequent transplant, which comprises an elongate body having parallel opposite sides and a top surface, said body having a series of transverse troughs extending through said opposite sides and which are spaced apart by equal amounts in which each amount is equal to the distance between the parallel sides to present a series of open-topped and open-sided recesses for receiving plugs of soil in which germination and growth of seedling may take place.

8. An elongate strip as defined in claim 7 including a guide depending from the body.

9. In combination, a plurality of elongate strips for germinating and growing seedlings for subsequent transplant, each of said strips comprising an elongate body having a bottom, parallel opposite sides and a top surface, said body having a series of transverse troughs extending through said opposite sides and which are spaced apart by equal amounts in which each amount is equal to the distance between the parallel sides to present a series of open-topped and open-sided recesses for receiving plugs of soil in which germination and growth of seedlings may take place, each of said bodies including a guide depending therefrom, and support tray means for receiving the guides of the strips to hold the strips in side-by-side contiguous relation.

10. The combination as defined in claim 9 wherein troughs of adjacent strips are staggered by said equal amounts whereby the body of one strip blocks one side of the recesses of an adjacent strip.

11. The combination as defined in claim 10 wherein said troughs are of rectilinear U-shaped form.

12. The combination as defined in claim 10 including drainage openings in the bottom of each trough.

13. The combination as defined in claim 12 including coupling means at the opposite ends of each strip for detachably coupling the strips in end-to-end relation.

14. Apparatus for germinating and growing seedlings for subsequent transplant comprising an elongate strip including a body having a bottom, substantially parallel opposite side surfaces and a top surface, said body having a width defined between said side surfaces and a length, said body including a plurality of similar body portions spaced from one another along the length of said body to define a plurality of compartments, each of said body portions having a substantially planar surface thereon extending downwardly from said top surface and substantially perpendicular thereto and extending from one of said side surfaces to the opposite one of said side surfaces and substantially perpendicular to said side surfaces such that each of said planar surfaces on one of said body portions is disposed in spaced facing substantially parallel relationship to a similar planar surface on an adjacent body portion, thereby defining a compartment between each pair of said spaced facing planar surfaces, each of said compartments being open at said top surface and at said opposite side surfaces, said body including a plurality of bottom surfaces disposed between adjacent ones of said planar surfaces to define a bottom for each of said compartments to support a plug of soil, each of said bottom surfaces being disposed substantially perpendicular to the associated planar surfaces and side surfaces, each of said compartments having a lengthwise dimension substantially equal to the lengthwise dimension of said body portions.

15. Apparatus as defined in claim 14 including means for supporting said body such that said top surface and said bottom surfaces are substantially horizontal, and said side surfaces and said planar surfaces are substantially vertical.

16. Apparatus as defined in claim 14 wherein said body means includes an undersurface opposite said top surface, and guide means extending from said undersurface.

17. Apparatus as defined in claim 14 wherein said body means includes drainage means formed in said bottom surfaces.

18. Apparatus as defined in claim 14 including an additional pair of elongate strips of substantially identical construction to said first-mentioned elongate strip, said additional pair of elongate strips being disposed in engagement with said opposite side surfaces of said first-mentioned elongate strip with said additional pair of elongate strips being staggered with respect to said first-mentioned elongate strip by a distance equal to the lengthwise dimension of said body portions such that the body portions of said additional pair of elongate strips block off the side openings of the compartments of said first-mentioned elongate strip.

19. Apparatus as defined in claim 18 including coupling means at the opposite ends of each of said strips for detachably coupling the strips in end-to-end relation.

* * * * *